United States Patent
Pedrick et al.

(10) Patent No.: US 10,782,178 B2
(45) Date of Patent: Sep. 22, 2020

(54) LOAD TRANSFER MECHANISM FOR WEIGH IN MOTION

(71) Applicants: TE CONNECTIVITY CORPORATION, Berwyn, PA (US); Tyco Electronics (Shanghai) Co., Ltd., Shanghai (CN)

(72) Inventors: Michael Pedrick, Williamsburg, VA (US); Shenghua Liu, Shenzhen (CN); Chengya Xiong, Shenzhen (CN)

(73) Assignees: TE CONNECTIVITY CORPORATION, Berwyn, PA (US); TYCO ELECTRONICS (SHANGHAI) CO., LTD., Shanghai (CN)

( * ) Notice: Subject to any disclaimer, the term of this patent is extended or adjusted under 35 U.S.C. 154(b) by 224 days.

(21) Appl. No.: 15/991,293

(22) Filed: May 29, 2018

(65) Prior Publication Data
US 2019/0301922 A1    Oct. 3, 2019

(30) Foreign Application Priority Data
Mar. 30, 2018   (CN) .......................... 2018 1 0293437

(51) Int. Cl.
| G01G 19/03 | (2006.01) |
| G01L 1/16 | (2006.01) |
| G01G 3/13 | (2006.01) |
| G01G 19/02 | (2006.01) |
| G01G 21/16 | (2006.01) |

(52) U.S. Cl.
CPC ........... *G01G 19/03* (2013.01); *G01G 19/024* (2013.01); *G01G 21/167* (2013.01); *G01G 3/13* (2013.01); *G01L 1/16* (2013.01)

(58) Field of Classification Search
CPC .... G01G 19/03; G01G 19/024; G01G 21/167; G01G 3/13; G01G 23/01; G01L 1/16
See application file for complete search history.

(56) References Cited

U.S. PATENT DOCUMENTS 4,286,680 A  *  9/1981  Maltby ................ G01G 19/025
                                                          177/208
5,265,481 A  *  11/1993  Sonderegger ............ G01G 3/13
                                                          177/210 C
(Continued)

FOREIGN PATENT DOCUMENTS

CN         102564549 A       7/2012
CN         102564548 B       4/2014
(Continued)

*Primary Examiner* — Randy W Gibson

(57) ABSTRACT

A load transfer mechanism includes an elongated beam and a sensing package. The beam includes a plate with a load-bearing surface, a tube portion, and a neck. The tube portion includes a base wall and a cover and defines a cavity between the base wall and the cover. The base wall laterally extends from a first edge to a second edge that is opposite the first edge. The cover is joined to the base wall at or proximate to the first and second edges. The neck extends between and joins the plate to the cover of the tube portion. The sensing package is disposed within the cavity of the beam and is under pre-load in engagement with the cover and the base wall. The sensing package is configured to measure forces exerted on the load-bearing surface of the plate.

22 Claims, 3 Drawing Sheets

(56) References Cited

U.S. PATENT DOCUMENTS

| | | |
|---|---|---|
| 5,461,924 A | 10/1995 | Calderara et al. |
| 5,501,111 A * | 3/1996 | Sonderegger ............ G01G 3/13 29/25.35 |
| 9,228,882 B2 * | 1/2016 | Ruby ..................... G01G 19/08 |
| 9,304,032 B2 | 4/2016 | Cornu et al. |
| 9,347,816 B2 | 5/2016 | Cornu et al. |

FOREIGN PATENT DOCUMENTS

| | | |
|---|---|---|
| WO | 2013056381 A1 | 4/2013 |
| WO | 2013071452 A1 | 5/2013 |

* cited by examiner

LOAD TRANSFER MECHANISM FOR WEIGH IN MOTION

CROSS-REFERENCE TO RELATED APPLICATIONS

This application claims priority to China Patent Application No. 2018/10293437.7, which was filed Mar. 30, 2018 and is titled Load Transfer Mechanism for Weigh in Motion. The subject matter of which is herein incorporated by reference in its entirety

BACKGROUND

The subject matter herein relates generally to load transfer mechanisms configured to measure forces exerted on the load transfer mechanisms for weigh in motion applications.

Some sensors are configured to measure external forces exerted on housings of the sensors that hold and protect the sensing element(s) from the external forces. For example, weigh-in-motion sensors are typically installed in a roadway and extend at least partially across a width of the roadway to measure the dynamic ground forces of vehicles (e.g., automobiles and trucks) traveling along the roadway as the vehicles move over the sensors. The measurement data from the weigh-in-motion sensors is typically used to calculate axle weights of the vehicles, and such information can be used to determine if any vehicles are non-compliant with set regulations (e.g., overweight), for future infrastructure planning, and the like.

The weigh-in-motion sensors typically include an elongated housing that has top and bottom plates and a cylindrical tube disposed between the top and bottom plates. The weigh-in-motion sensors also have narrow transitions or necks that join the cylindrical tube to the top and bottom plates. A sensing element is held within the cylindrical tube in pre-load between upper and lower interior surfaces of the tube. Known weigh-in-motion sensors are vertically symmetric, such that the sensing element is located at a vertical midpoint of the housing between the top and bottom plates.

There is a trade-off in weigh-in-motion sensors between sensitivity (e.g., accuracy and precision of measuring the forces) and structural integrity of the sensor housing. For example, sensitivity may be increased by directing more of the external load to the sensing element, but known sensors housings that direct sufficient load to the sensing element for increased sensitivity suffer from high combined stresses, which may reduce the operational lifetimes of the sensor housings. Known sensor housings experience high stresses at the narrow transition or neck region between the top plate and the cylindrical tube. The structural integrity of the housing may be improved (and the operational lifetime increased) by increasing the stiffness in the housing, which directs a greater percentage of the external load through structural support paths in the housing instead of through the sensing element. But, reducing the load that is directed to the sensing element may undesirably reduce the measurement sensitivity.

A need remains for a load transfer mechanism that has sufficient structural integrity to reliably withstand external loads for a desired operational lifetime while providing desired measurement sensitivity.

SUMMARY

In one or more embodiments of the present disclosure, a load transfer mechanism is provided that includes a beam and a sensing package. The beam is elongated along a depth axis of the load transfer mechanism. The beam includes a plate with a load-bearing surface, a tube portion, and a neck. The tube portion includes a base wall and a cover and defines a cavity between the base wall and the cover. The base wall laterally extends from a first edge to a second edge that is opposite the first edge. The cover is joined to the base wall at or proximate to the first and second edges. The neck extends between and joins the plate to the cover of the tube portion. The sensing package is disposed within the cavity of the beam and is under pre-load in engagement with the cover and the base wall. The sensing package is configured to measure forces exerted on the load-bearing surface of the plate.

In one or more embodiments of the present disclosure, a beam of a load transfer mechanism is provided that is elongated along a depth axis of the load transfer mechanism. The beam includes a plate that has a load-bearing surface, a tube portion, and a neck. The tube portion includes a base wall and a cover. The base wall and the cover include respective interior surfaces that define a cavity therebetween. The cavity is elongated along the depth axis and is configured to receive a sensing package therein that engages the respective interior surfaces of the cover and the base wall for measuring forces exerted on the load-bearing surface of the plate. The neck extends between and joins the plate to the cover such that the neck transmits forces exerted on the load-bearing surface to the sensing package via the cover. The neck tapers from a wide end at the plate to a narrow end at the cover. The beam extends a height from the load-bearing surface of the plate to a mounting surface of the base wall. A midpoint of the height of the beam is vertically spaced apart from a midpoint of a height of the cavity between the respective interior surfaces of the cover and the base wall.

In one or more embodiments of the present disclosure, a beam of a load transfer mechanism is provided that is elongated along a depth axis of the load transfer mechanism. The beam includes a plate that has a load-bearing surface, a tube portion, and a neck. The tube portion includes a base wall, two upright members, and a ceiling member. The two upright members are joined to different corresponding lateral edges of the base wall. The ceiling member is connected to and extends between the two upright members to define a cavity. The cavity has an oblong cross-sectional shape such that a width of the cavity between the two upright members is greater than a height of the cavity between the ceiling member and the base wall. The cavity is configured to receive a sensing package therein that engages respective interior surfaces of the ceiling member and the base wall for measuring forces exerted on the load-bearing surface of the plate. The neck extends between and joins the plate to the ceiling member such that the neck transmits forces exerted on the load-bearing surface to the sensing package via the ceiling member. The neck tapers from a wide end at the plate to a narrow end at the ceiling member.

DETAILED DESCRIPTION

Embodiments of the present disclosure provide a load transfer mechanism that includes a sensing package and a beam that structurally protects and supports the sensing package. The sensing package is configured to measure forces exerted on the beam. As used herein, the term "sensing package" refers to one or more electrical elements that generate an electrical output signal responsive to a mechanical force application on the sensing package. The sensing package may include at least one piezo-electric element. One technical effect of the embodiments of the load transfer mechanism is the ability to absorb external forces with reduced internal stress within the beam relative to known sensor housings. Another technical effect of the embodiments described herein is that, in conjunction with the reduced internal stress in the beam, the beam is able to direct a greater percentage of the external load through the sensing assembly than known sensor housings, providing a greater measurement sensitivity. As a result, the sensing assembly according to the embodiments described herein may be able to provide increased measurement sensitivity and improved structural integrity of the beam relative to known sensors Although one or more embodiments of the load transfer mechanism are described herein for use in a weigh-in-motion application to measure forces exerted by moving vehicles on a roadway, it is recognized that the load transfer mechanism is not limited to weigh-in-motion applications. For example, the load transfer mechanism may be used in other applications to measure external forces exerted on the beam, such as industrial applications, lab testing applications, and the like.

Figure 1:
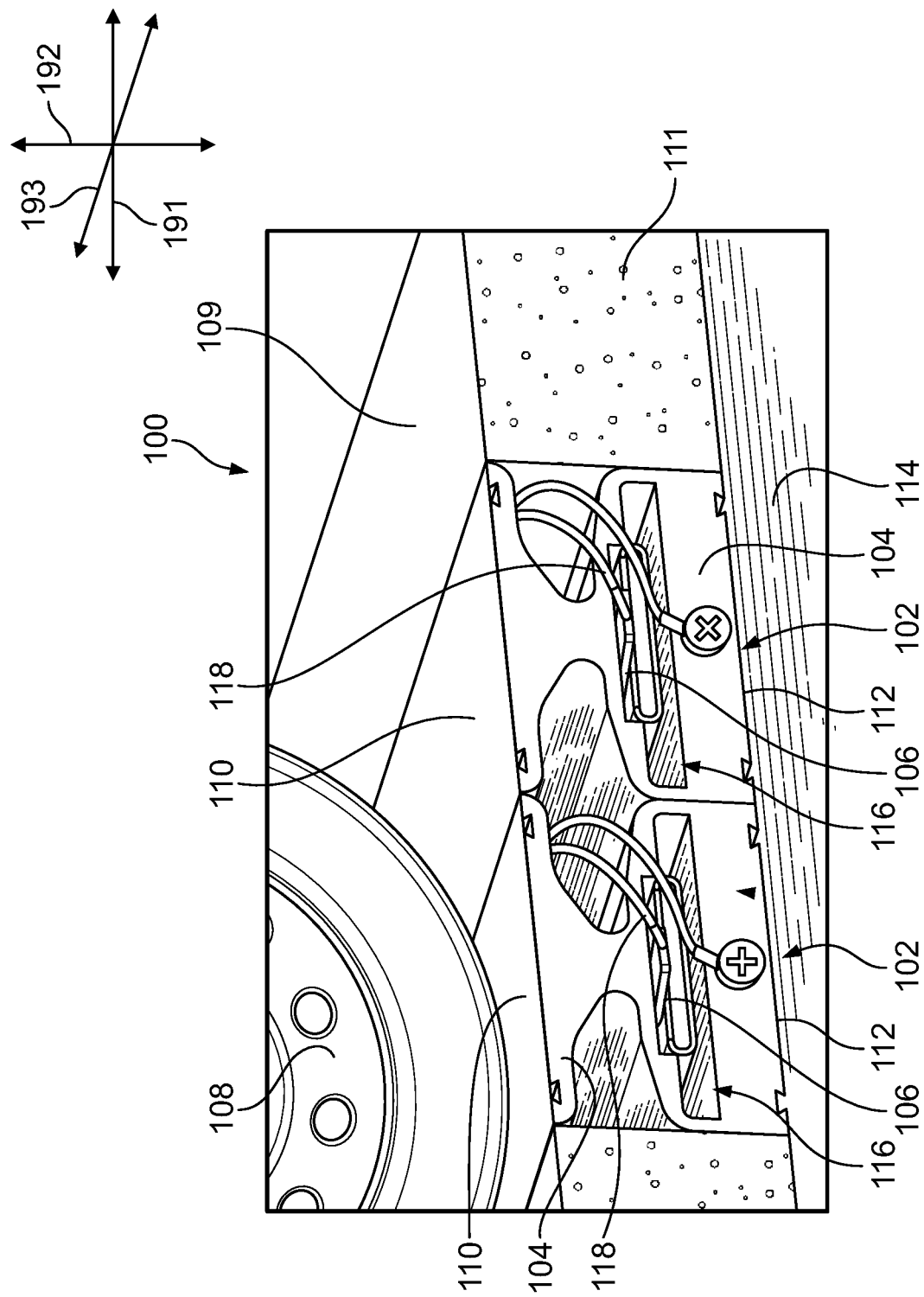
FIG. 1 is a perspective view of a measurement system that includes multiple sensor assemblies in accordance with an embodiment.

FIG. 1 is a perspective view of a measurement system 100 that includes multiple sensor assemblies 102 in accordance with an embodiment. Each of the sensor assemblies 102 includes a respective beam 104 and at least one sensing package 106. The sensing packages 106 are held within the respective beams 104. The two sensor assemblies 102 in the illustrated embodiment are disposed side-by-side, but may be spaced apart from each other in an alternative embodiment. The measurement system 100 is oriented with respect to a lateral axis 191, a vertical axis 192, and a longitudinal or depth axis 193. The axes 191-193 are mutually perpendicular. Although the vertical axis 192 appears to extend in a vertical direction parallel to gravity in FIG. 1, it is understood that the axes 191-193 are not required to have any particular orientation with respect to gravity.

The beams 104 of the sensor assemblies 102 are elongated along the depth axis 193. Each of the beams 104 extends vertically from a load-bearing surface 110 to a mounting surface 112. The mounting surfaces 112 are disposed on a foundation structure 114. The beams 104 define cavities 116 that are vertically spaced apart from the load-bearing surfaces 110 and the mounting surfaces 112. The sensing packages 106 are disposed within the cavities 116.

In the illustrated embodiment, the measurement system 100 is a weigh-in-motion sensor system. FIG. 1 shows a portion of a wheel 108 of a vehicle traveling on the load-bearing surfaces 110 of the sensor assemblies 102. The load-bearing surfaces 110 of the adjacent sensor assemblies 102 are generally flush with a road surface 109. For example, the sensor assemblies 102 may be embedded within a road material 111, such as concrete, gravel, asphalt, or the like, that defines the road surface 109. The vehicle may be an automobile, truck, a motorcycle, a recreational vehicle, or another type of vehicle. The vehicle moves generally laterally such that the wheel 108 moves over the adjacent sensor assemblies 102, and exerts a mechanical force on the load-bearing surface 110 of each of the beams 104. The mechanical force exerted by the wheel 108 on the load-bearing surface 110 is transmitted through the internal structure of the beam 104, and at least a portion of the force is exerted on the sensing package 106 within the cavity 116. In an embodiment, the force exerted on the sensing package 106 causes the sensing package 106 to generate an electrical output signal proportional to the amount of force. The electrical output signal is conveyed along one or more electrical wires 118 to a remote processor (not shown), which is configured to convert the electrical output signal to a measurement parameter, such as a weight of the vehicle at the axle including the wheel 108.

Although the two sensor assemblies 102 are side-by-side in the illustrated embodiment, the measurement system 100 may have various different numbers and arrangements of sensor assemblies 102 in alternative embodiments. For example, two or more sensor assemblies 102 may be arranged end-to-end along the depth axis 193 across at least one lane of the road. In another example, two or more sensor assemblies 102 may be spaced apart laterally from each other such that the road material 111 is disposed between and separates the two sensor assemblies 102.

Although in the illustrated embodiment the wheel 108 directly engages the load-bearing surfaces 110, in an alternative embodiment the load-bearing surfaces 110 may be separated from the wheel 108 via one or more intervening layers. The one or more intervening layers may include a layer of pavement, concrete, gravel, adhesive binders, or the like. The beams 104 optionally may be at least partially embedded within a filler material, such as concrete, dirt, gravel, adhesive binders, or the like, to secure the positioning of the beams 104.

Figure 2:
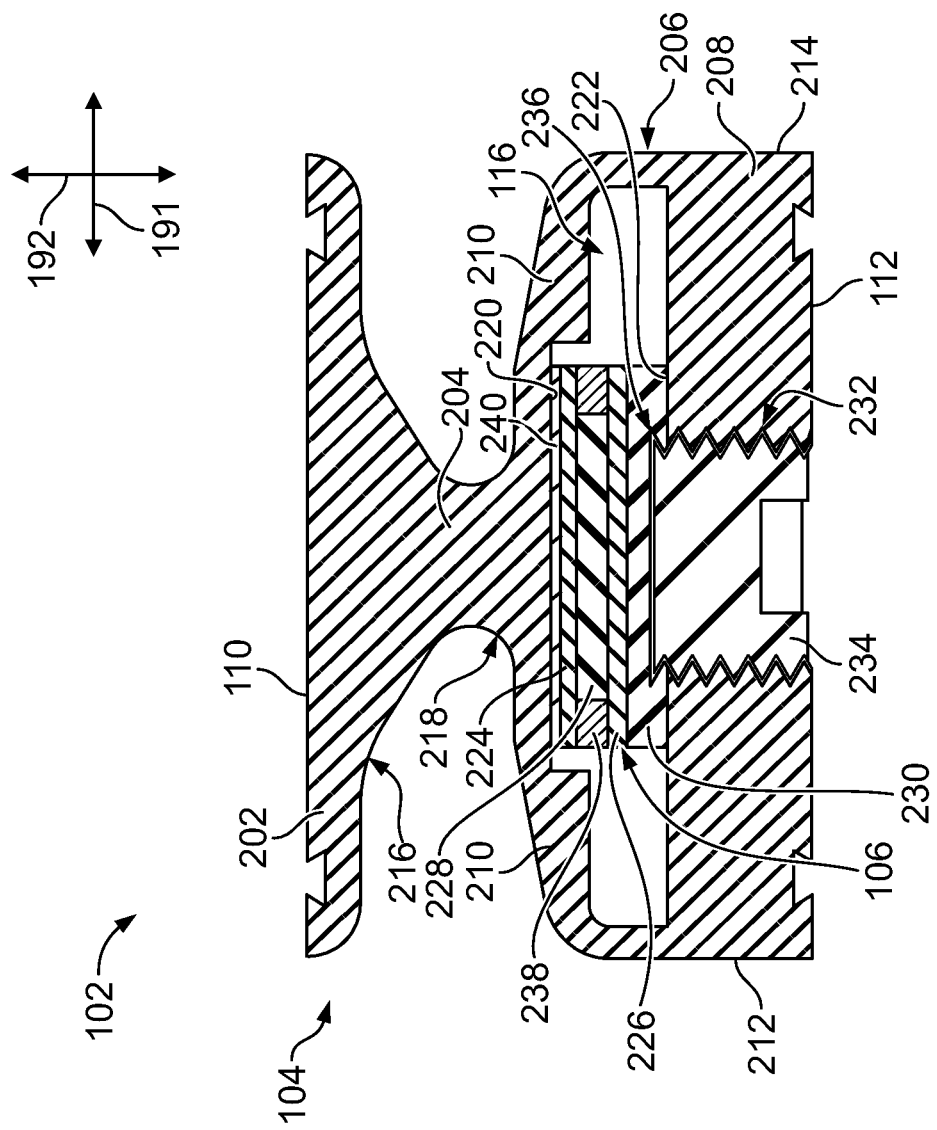
FIG. 2 is a cross-sectional view of one of the sensor assemblies of the measurement system according to an embodiment.

FIG. 2 is a cross-sectional view of one of the sensor assemblies 102 of the measurement system 100 according to an embodiment. The beam 104 includes a plate 202, a neck 204, and a tube portion 206. The plate 202 defines the load-bearing surface 110. The tube portion 206 defines the cavity 116 that holds the sensing package 106. The neck 204 extends between the plate 202 and the tube portion 206 and joins the plate 202 to the tube portion 206.

The tube portion 206 includes a base wall 208 and a cover 210. The cavity 116 is defined between the base wall 208 and the cover 210. The base wall 208 defines the mounting surface 112. The cover 210 is located between the neck 204 and the base wall 208 and is joined to the neck 204. The base wall 208 laterally extends (e.g., along the lateral axis 191) between a first edge 212 of the base wall 208 and a second edge 214 of the base wall 208 (which is opposite the first edge 212). The cover 210 is joined to the base wall 208 at or proximate to the first and second edges 212, 214. In the illustrated embodiment, the cover 210 is joined to the base wall 208 at the first and second edges 212, 214. But, in an alternative embodiment, the cover 210 may be joined proximate to, but not at, the edges 212, 214, such as within designated threshold distance from each of the edges 212, 214. For example, the designated threshold distance may be 5% or 10% of the lateral width of the base wall 208. From the edges 212, 214 of the base wall 208, the cover 210 extends vertically upward (e.g., towards the plate 202) and laterally.

In the illustrated embodiment, the cavity 116 has an oblong cross-sectional shape that is elongated along the lateral axis 191. Although not shown in the illustrated cross-sectional view, the cavity 116 may extend along the depth axis 193 (shown in FIG. 1) with the beam 104.

The neck 204 tapers from a wide end 216 at the plate 202 to a narrow end 218 at the cover 210. The wide end 216 has a greater lateral width or thickness than the narrow end 218. The neck 204 is configured to transmit forces exerted on the load-bearing surface 110 of the plate 202 to the sensing package 106 via the cover 210 of the tube portion 206. For example, the neck 204 defines a determinate load path, which is a single path that transmits the load from the plate 202 to the cover 210. The neck 204 may also limit or reduce stress concentrations internally within the beam 104 (e.g., relative to the housings of known sensor assemblies). Optionally, the plate 202 may have a greater lateral width than the wide end 216 of the neck 204.

In an embodiment, the beam 104 has a unitary, one-piece, monolithic structure. The neck 204 is integrally connected to the plate 202 and the tube portion 206, and the cover 210 of the tube portion 206 is integrally connected to the base wall 208. For example, the beam 104 may extend continuously, without seams, from the plate 202 to the base wall 208. The beam 104 in an embodiment may be formed via an extrusion process. The beam 104 may be composed of a metal material, such as aluminum, steel, and/or another metal.

The sensing package 106 within the cavity 116 is disposed under pre-load between the cover 210 and the base wall 208. For example, the sensing package 106 engages an interior surface 220 of the cover 210 and an interior surface 222 of the base wall 208. The cavity 116 is defined between the interior surfaces 220, 222. The sensing package 106 is under pre-load such that the sensing package 106 exerts a force on both the cover 210 and the base wall 208.

The sensing package 106 may include multiple layers. In the illustrated embodiment, the sensing package 106 includes a first electrode 224, a second electrode 226, and a piezoelectric element 228 stacked between the two electrodes 224, 226. The first electrode 224 is disposed between the cover 210 and the piezoelectric element 228. The second electrode 226 is disposed between the piezoelectric element 228 and the base wall 208. The piezoelectric element 228 may be a crystal of quartz, tourmaline, lead zirconate titanate (PZT), or the like. Although the piezoelectric element 228 is described as singular, the piezoelectric element 228 may represent a plurality of piezoelectric elements within the sensing package 106. In the illustrated embodiment, the sensing package 106 also includes a guide plate 238 between the first and second electrodes 224, 226. The guide plate 238 at least partially circumferentially surrounds the piezoelectric element 228 to control the position and alignment of the one or more piezoelectric elements. The first and second electrodes 224, 226 may include respective metal plates or sheets. The sensing package 106 optionally includes a substrate 230 vertically disposed between the second electrode 226 and the base wall 208. The substrate 230 may include a dielectric material, such as one or more plastics, and/or a conductive material, such as one or more metals. The sensing package 106 may have different components in alternative embodiments.

In an embodiment, the electrically conductive material (e.g., metal sheets) of the electrodes 224, 226 of the sensing package 106 is mechanically separate from and electrically isolated from the beam 104. For example, an electrically insulating layer 240 is disposed between the cover 210 and the metal sheet of the first electrode 224. The insulating layer 240 may include a dielectric material, such as one or more plastics. The insulating layer 240 may be a discrete component from the first electrode 224, or alternatively may represent a portion of the first electrode 224. The second electrode 226 is separated from the beam 104 by the substrate 230. Optionally, the substrate 230 may be composed of a dielectric material such that the substrate 230 is an electrically insulating layer that electrically isolates the second electrode 226 from the base wall 208 of the beam 104. Alternatively, or additionally, the second electrode 226 may include a discrete electrically insulating layer (not shown) disposed between the conductive metal sheet of the second electrode 226 and the substrate 230 (which may or may not be electrically conductive), such that the electrically insulating layer provide electrical isolation of the second electrode 226 from the beam 104. Since the sensing package 106 is electrically isolated from the beam 104, the beam 104 may not be used as a ground return path through direct ohmic contact between the electrodes 224, 226 and the beam 104, which may beneficially reduce electrical interference and noise within the load transfer mechanism 102.

The base wall 208 defines an aperture 232 that extends through the base wall 208 from the mounting surface 112 to the interior surface 222, such that the aperture 232 is open to the cavity 116. The aperture 232 receives a fastener 234 therethrough to secure the sensing package 106 in the cavity 116. In the illustrated embodiment, the fastener 234 is a threaded set screw, and the aperture 232 has respective threads that are complementary to the set screw 234. In an alternative embodiment, the fastener may be a bolt, a type of screw other than a set screw, or the like. The fastener 234 is installed from below the mounting surface 112 of the beam 104. The fastener 234 is received into a mounting opening 236 of the substrate 230 of the sensing package 106. The fastener 234 engages the substrate 230 to secure the positioning of the sensing package 106 relative to the beam 104. In an alternative embodiment in which the sensing package 106 lacks the substrate 230, the fastener 234 may engage a bottom side of the second electrode 226.

In an embodiment, the depth that the fastener 234 extends into the base wall 208 and/or the cavity 116 may be adjusted in order to set an amount of pre-load on the sensing package 106. In the illustrated embodiment, the depth of the set screw 234 is adjusted by imparting a torque on the set screw 234. For example, increasing the depth that the fastener 234 extends into the cavity 116 may increase the amount of pre-load exerted on the sensing package 106, and reducing the depth that the fastener 234 extends into the cavity 116 may decrease the amount of pre-load exerted on the sensing package 106. By adjusting the positions of the fasteners 234 that engage multiple sensing packages 106 along a depth of a single load transfer mechanism 102 or multiple sensor assemblies 102, an operator can individually tune each of the sensing packages 106 to a designated pre-load, thereby reducing or eliminating pre-load discrepancies caused by component irregularities and imperfections. Individually tuning the pre-load on each of the sensing packages 106, via the fasteners 234 extending through the base wall 208, may improve the uniformity of output as a function of applied load across the entire depth of the load transfer mechanism 102.

Figure 3:
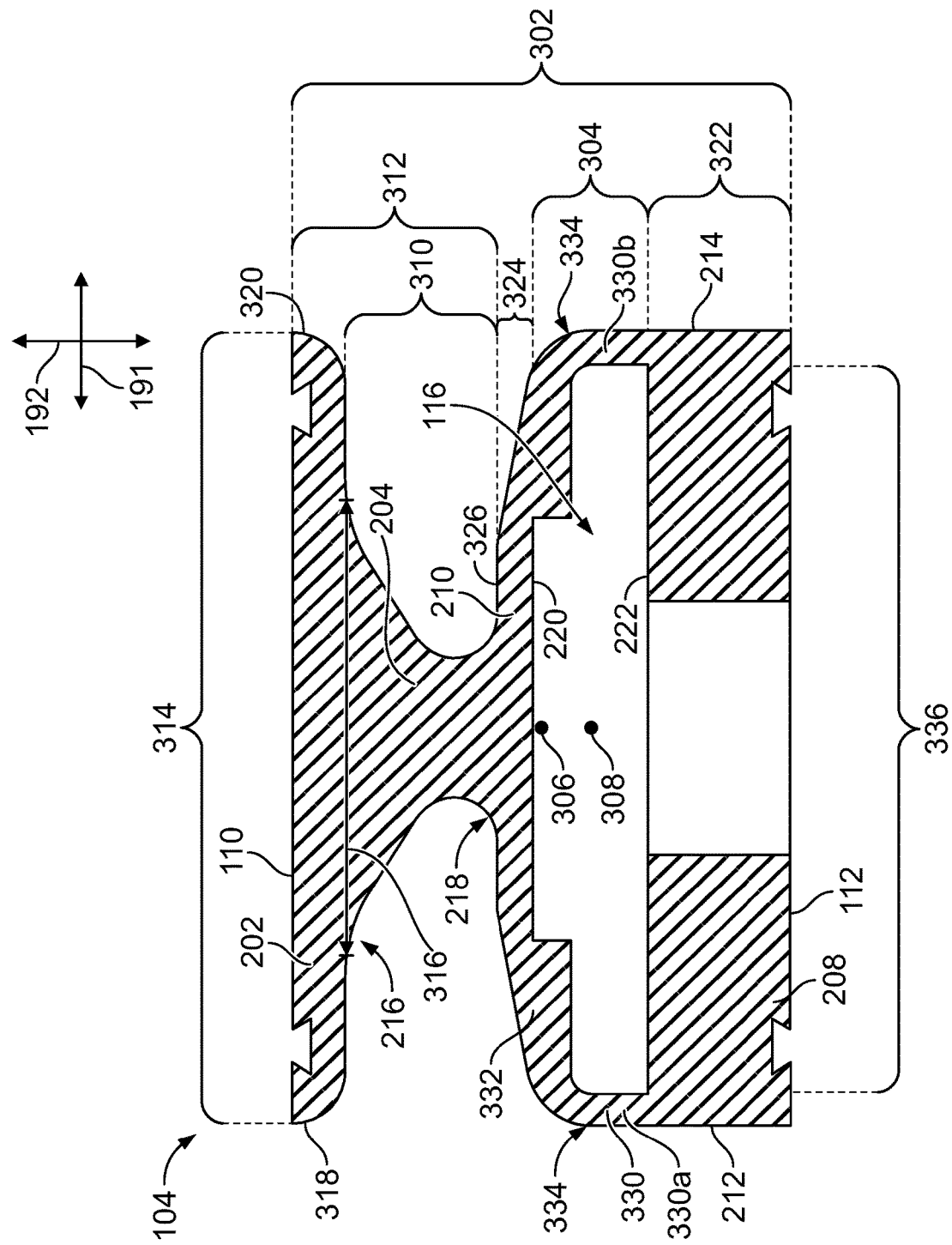
FIG. 3 is a cross-sectional view of a beam of one of the sensor assemblies of the measurement system according to an embodiment.

FIG. 3 is a cross-sectional view of the beam 104 the load transfer mechanism 102 shown in FIG. 2. The sensing package 106 and fastener 234 are omitted for clarity in FIG. 3. The beam 104 extends a height 302 from the load-bearing surface 110 of the plate 202 to the mounting surface 112 of the base wall 208. The cavity 116 extends a height 304 from the interior surface 220 of the cover 210 to the interior surface 222 of the base wall 208. In the illustrated embodiment, a midpoint 306 of the height 302 of the beam 104 (e.g., half way between the load-bearing surface 110 and the mounting surface 112) is spaced apart vertically from a midpoint 308 of the height 304 of the cavity 116. Specifically, the midpoint 306 of the beam 104 is disposed above the midpoint 308 of the cavity 116, such that the midpoint 306 is located vertically between the midpoint 308 and the load-bearing surface 110 of the plate 202. Since the cavity 116 is not vertically centered with the beam 104, the sensing package 106 (shown in FIG. 2) within the cavity 116 is also not vertically centered relative to the beam 104.

The neck 204 extends a height 310 from the plate 202 to the cover 210. In the illustrated embodiment, the height 310 of the neck 204 is at least 20% of the height 302 of the beam 104, and optionally may be at least 20% of the height 302. For example, if the beam 104 is 10 cm tall, then the neck 204 may be at least 2 cm tall, and optionally at least 2.5 cm tall. The neck 204 combined with the plate 202 have a combined height 312 from the load-bearing surface 110 to the cover 210. In the illustrated embodiment, the combined height 312 may be at least 33% of the height 302 of the beam 104.

The plate 202 extends a lateral width 314 from a first edge 318 to an opposite, second edge 320 thereof. In an embodiment, the wide end 216 of the neck 204 that is joined to the plate 202 has a width 316 that is at least half (e.g., 50%) of the width 314 of the plate 202. Thus, the neck 204 has a relatively thick width at the wide end 216 and gradually tapers to the narrow end 218. The thick, tapered neck 204 may be able to dissipate stress over a larger area than the transition or neck regions of known sensor assemblies, resulting in a reduced peak stress within the neck 204.

The base wall 208 has a vertical thickness 322 from the mounting surface 112 to the interior surface 222 of the base wall 208. The cover 210 has a thickness 324 from the interior surface 220 to an exterior surface 326 of the cover 210. The exterior surface 326 is joined to the neck 204. In the illustrated embodiment, the thickness 322 of the base wall 208 is greater than the thickness 324 of the cover 210. For example, the thick base wall 208 provides a support base for the beam 104. The cover 210 may be relatively thin to provide structural support while allowing load transfer from the neck 204 to the sensing package 106 (FIG. 2) within the cavity 116.

In the illustrated embodiment, the cover 210 of the beam 104 includes two upright members 330 and a ceiling member 332 extending between and connecting the two upright members 330. The upright members 330 are joined to the base wall 208 at, or proximate to, the first and second edges 212, 214 thereof. For example, the upright members 330 include a first upright member 330a joined to the base wall 208 at the first edge 212 and a second upright member 330b joined to the base wall 208 at the second edge 214. The upright members 330 extend generally vertical, parallel to the vertical axis 192. For example, axes or planes of the upright members 330 may be within 5 degrees, 10 degrees, or 15 degrees of the vertical axis 192. The ceiling member 332 is connected (e.g., joined) to respective upper ends 334 of the upright members 330, spaced apart from the base wall 208. As used herein, relative or spatial terms such as "upper," "lower," "top," "bottom," "front," and "rear" are only used to distinguish the referenced elements and do not necessarily require particular positions or orientations relative to gravity and/or the surrounding environment of the beam 104 or load transfer mechanism 102 (FIG. 2).

The ceiling member 332 laterally extends between the two upright members 330. The ceiling member 332 may be arched or curved in an upward direction away from the base wall 208. The ceiling member 332 defines the exterior surface 326 of the cover 210 that is joined to the neck 204. The neck 204 may be joined to the exterior surface 326 at a lateral center of the ceiling member 332, which is a midpoint between the two upright members 330. The ceiling member 332 defines the interior surface 220 that engages the sensing package 106. The cavity 116 is defined laterally between the two upright members 330 and vertically between the interior surface 222 of the base wall 208 and the interior surface 220 of the ceiling 332. In the illustrated embodiment, the cavity 116 has an oblong cross-sectional shape such that a width 336 of the cavity 116 is greater than the height 304 of the cavity 116. Thus, the cavity 116 does not have a circular cross-sectional shape in the illustrated embodiment.

Referring now to FIGS. 1-3, the load transfer mechanism 102 according to the embodiments described herein has a beam 104 that is asymmetrical along the height 302 of the beam 104, such that a top half of the beam 104 (e.g., including the plate 202) does not mirror a lower half of the beam 104 (e.g., including the base wall 208). The designed shape of the beam 104 may lower the neutral axis of the beam 104 below the geometric midpoint 306 of the beam 104. The neutral axis represents the axis through the beam 104 where the stress is zero, without compression or tension. The neutral axis may align with the cavity 116, such that the sensing package 106 is located at or proximate to the neutral axis. Locating the sensing package 106 at the neutral axis may eliminate (or at least reduce) shear stress influence on the sensing package 106 (relative to spacing the sensing package 106 apart from the neutral axis).

The neck 204 of the beam 104 may have a longer vertical height 310 relative to the height 302 of the beam 104 than known sensor assemblies, which may provide the benefit of a longer determinate (e.g., single) load path transition from the top, load-bearing surface 110 to the sensing package 106. The neck 204 also may taper gradually from a wide end 216 at the plate 202 to a narrow end 218 at the cover 210. The longer determinate load path and thick, tapered neck 204 may allow for increased load transfer with reduced stress in the beam 104 relative to known sensor assemblies that have short and/or narrow necks between top plates and tube regions that hold the sensing elements.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. Dimensions, types of materials, orientations of the various components, and the number and positions of the various components described herein are intended to define parameters of certain embodiments, and are by no means limiting and are merely example embodiments. Many other embodiments and modifications within the spirit and scope of the claims will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A load transfer mechanism comprising:
   a beam elongated along a depth axis of the load transfer mechanism, the beam comprising:
   a plate with a load-bearing surface;
   a tube portion including a base wall and a cover and defining a cavity between the base wall and the cover, the base wall laterally extending from a first edge to a second edge that is opposite the first edge, wherein the cover includes two upright members that are joined to the base wall at or proximate to the first and second edges and that define a lateral dimension of the cavity therebetween, wherein the first and second edges extend from the two upright members to a base wall mounting surface, and wherein the tube portion has a substantially constant external lateral dimension moving along the two upright members and first and second edges to the mounting surface; and
   a neck extending between and joining the plate to the cover of the tube portion; and
   a sensing package disposed within the cavity of the beam and under pre-load in engagement with the cover and the base wall, the sensing package configured to measure forces exerted on the load-bearing surface of the plate.

2. The load transfer mechanism of claim 1, wherein the beam extends a height from the load-bearing surface of the plate to the mounting surface of the base wall and the cavity extends a height from an interior surface of the cover to an interior surface of the base wall, wherein a midpoint of the height of the beam is disposed above a midpoint of the height of the cavity.

3. The load transfer mechanism of claim 1, wherein the neck tapers from a wide end at the plate to a narrow end at the cover.

4. The load transfer mechanism of claim 1, wherein a height of the neck from the plate to the cover is at least 20% of a height of the beam from the load-bearing surface of the plate to the mounting surface of the base wall.

5. The load transfer mechanism of claim 1, wherein the cavity has an oblong cross-sectional shape that is elongated along a lateral axis of the load transfer mechanism.

6. The load transfer mechanism of claim 1, wherein a thickness of the base wall between the mounting surface and an interior surface thereof is greater than a thickness of the cover between an interior surface and an exterior surface thereof, the interior surfaces of the base wall and the cover defining the cavity.

7. The load transfer mechanism of claim 1, wherein the cover includes a ceiling member connected to and extending between the two upright members.

8. The load transfer mechanism of claim 7, wherein the ceiling member has an interior surface and an exterior surface opposite the interior surface, the interior surface defining the cavity and engaging the sensing package, the neck extending from the exterior surface at a lateral center of the ceiling member between the two upright members.

9. The load transfer mechanism of claim 1, wherein the base wall defines an aperture through the base wall from the mounting surface thereof to the cavity, the aperture configured to receive a fastener therethrough to secure the sensing package in the cavity.

10. The load transfer mechanism of claim 9, wherein the fastener is a threaded screw configured to engage the sensing package, wherein a depth that the threaded screw extends into the cavity is adjustable via a torque application on the threaded screw to modify a force of the pre-load exerted on the sensing package.

11. The load transfer mechanism of claim 1, wherein the sensing package includes a piezoelectric element stacked between a first electrode and a second electrode, such that the first electrode is disposed between the piezo electric element and the cover and the second electrode is between the piezoelectric element and the base wall.

12. The load transfer mechanism of claim 11, wherein the first and second electrodes are mechanically separated from and electrically isolated from the beam via corresponding electrically insulating layers.

13. The load transfer mechanism of claim 1, wherein the beam has a unitary, monolithic structure such that the neck is integrally connected to the plate and the tube portion.

14. A beam of a load transfer mechanism elongated along a depth axis of the load transfer mechanism, the beam comprising:
   a plate with a load-bearing surface;
   a tube portion including a base wall and a cover, the base wall and the cover including respective interior surfaces that define a cavity therebetween, the cavity elongated along the depth axis and configured to receive a sensing package therein that engages the respective interior surfaces of the cover and the base wall for measuring forces exerted on the load-bearing surface of the plate; and
   a neck extending between and joining the plate to the cover such that the neck transmits forces exerted on the load-bearing surface to the sensing package via the cover, the neck tapering from a wide end at the plate to a narrow end at the cover,
   wherein the beam extends a height from the load-bearing surface of the plate to a mounting surface of the base wall, wherein a midpoint of the height of the beam is vertically spaced apart from a midpoint of a height of the cavity between the respective interior surfaces of the cover and the base wall.

15. The beam of claim 14, wherein the base wall laterally extends from a first edge to a second edge that is opposite the first edge, wherein the cover is joined to the base wall at or proximate to the first and second edges.

16. The beam of claim 14, wherein the vertical midpoint of the height of the beam is disposed vertically between the load-bearing surface of the plate and the vertical midpoint of the height of the cavity.

17. The beam of claim 14, wherein the beam has a unitary, monolithic structure such that the neck is integrally connected to the plate and the tube portion.

18. The beam of claim 14, wherein the cavity has an oblong cross-sectional shape that is elongated along a lateral axis of the beam.

19. The beam of claim 14, wherein a combined height of the neck and the plate from the load-bearing surface to the cover is at least 33% of the height of the beam.

20. The beam of claim 14, wherein the wide end of the neck has a width that is at least 50% of a width of the plate along a lateral axis of the beam.

21. A beam of a load transfer mechanism elongated along a depth axis of the load transfer mechanism, the beam comprising:
- a plate with a load-bearing surface;
- a tube portion including a base wall, two upright members, and a ceiling member, the two upright members joined to different corresponding lateral edges of the base wall, the ceiling member connected to and extending between the two upright members to define a cavity, the cavity having an oblong cross-sectional shape such that a width of the cavity between the two upright members is greater than a height of the cavity between the ceiling member and the base wall, the cavity configured to receive a sensing package therein that engages respective interior surfaces of the ceiling member and the base wall for measuring forces exerted on the load-bearing surface of the plate, the tube portion having a substantially constant lateral external dimension extending along the two upright members and lateral edges to a mounting surface of the base wall that is opposite the plate load-bearing surface; and
- a neck extending between and joining the plate to the ceiling member such that the neck transmits forces exerted on the load-bearing surface to the sensing package via the ceiling member.

22. The beam of claim 21, wherein the beam extends a height from the load-bearing surface of the plate to the mounting surface of the base wall, and wherein a midpoint of the height of the beam is disposed above a midpoint of the height of the cavity.

\* \* \* \* \*